(12) United States Patent
Al Rammah et al.

(10) Patent No.: US 12,090,441 B2
(45) Date of Patent: Sep. 17, 2024

(54) METHODS OF REGENERATING A SORBENT

(71) Applicant: Saudi Arabian Oil Company, Dhahran (SA)

(72) Inventors: Abdullah Al Rammah, Dhahran (SA); Mourad Younes, Dhahran (SA); Ammar Alahmed, Dhahran (SA); Wajdi Issam Al Sadat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 259 days.

(21) Appl. No.: 17/657,898

(22) Filed: Apr. 4, 2022

(65) Prior Publication Data
US 2023/0311056 A1 Oct. 5, 2023

(51) Int. Cl.
*B01D 53/04* (2006.01)
*B01J 20/34* (2006.01)

(52) U.S. Cl.
CPC ...... *B01D 53/0462* (2013.01); *B01J 20/3466* (2013.01); *B01D 2253/204* (2013.01); *B01D 2257/504* (2013.01); *B01D 2258/0283* (2013.01); *B01D 2259/4009* (2013.01)

(58) Field of Classification Search
CPC .......... B01D 53/0462; B01D 2253/204; B01D 2257/504; B01D 2258/0283; B01D 2259/4009; B01J 20/3466; Y02C 20/40
See application file for complete search history.

(56) References Cited

U.S. PATENT DOCUMENTS

| | | | |
|---|---|---|---|
| 5,599,381 A * | 2/1997 | Whitlock | B01D 53/04 95/141 |
| 8,845,988 B2 * | 9/2014 | Radosz | B01D 53/04 423/220 |
| 9,504,955 B2 | 11/2016 | Elliott et al. | |
| 9,527,029 B2 | 12/2016 | Elliott et al. | |
| 10,821,393 B2 * | 11/2020 | Elliott | B01D 53/0446 |

FOREIGN PATENT DOCUMENTS

| | | |
|---|---|---|
| WO | 2010107942 | 9/2010 |
| WO | 2014170184 | 10/2014 |
| WO | 2015006267 | 1/2015 |

OTHER PUBLICATIONS

Fasihi et al., "Techno-economic assessment of $CO_2$ direct air capture plants." Journal of cleaner production 224, Jul. 2019, 957-980, 24 pages.

Goeppert et al., "Air as the renewable carbon source of the future: an overview of $CO_2$ capture from the atmosphere." *Energy & Environmental Science* 5.7, Mar. 2012, 7833-7853, 21 pages.

(Continued)

*Primary Examiner* — Sharon Pregler
(74) *Attorney, Agent, or Firm* — Fish & Richardson P.C.

(57) ABSTRACT

A method of treating a sorbent having a species sorbed thereto includes simultaneously providing first and second fluids to the sorbent to heat the sorbent and desorb the sorbed species from the sorbent. The first fluid is different from the second fluid. The first fluid includes steam. The second fluid is separable from the first fluid and the desorbed species.

20 Claims, 2 Drawing Sheets

(56) References Cited

OTHER PUBLICATIONS

Iea.org [online], "Putting CO2 to Use" Sep. 2019, [retrieved on May 17, 2022], retrieved from: URL <https://www.iea.org/reports/putting-co2-to-use>, 14 pages.

Keith et al., "A process for capturing CO2 from the atmosphere." Joule 2.8, Aug. 2018, 1573-1594, 23 pages.

Wen et al., "Metal-organic frameworks for environmental applications." Cell Reports Physical Science 2.2, 100348, Feb. 2021, 17 pages.

* cited by examiner

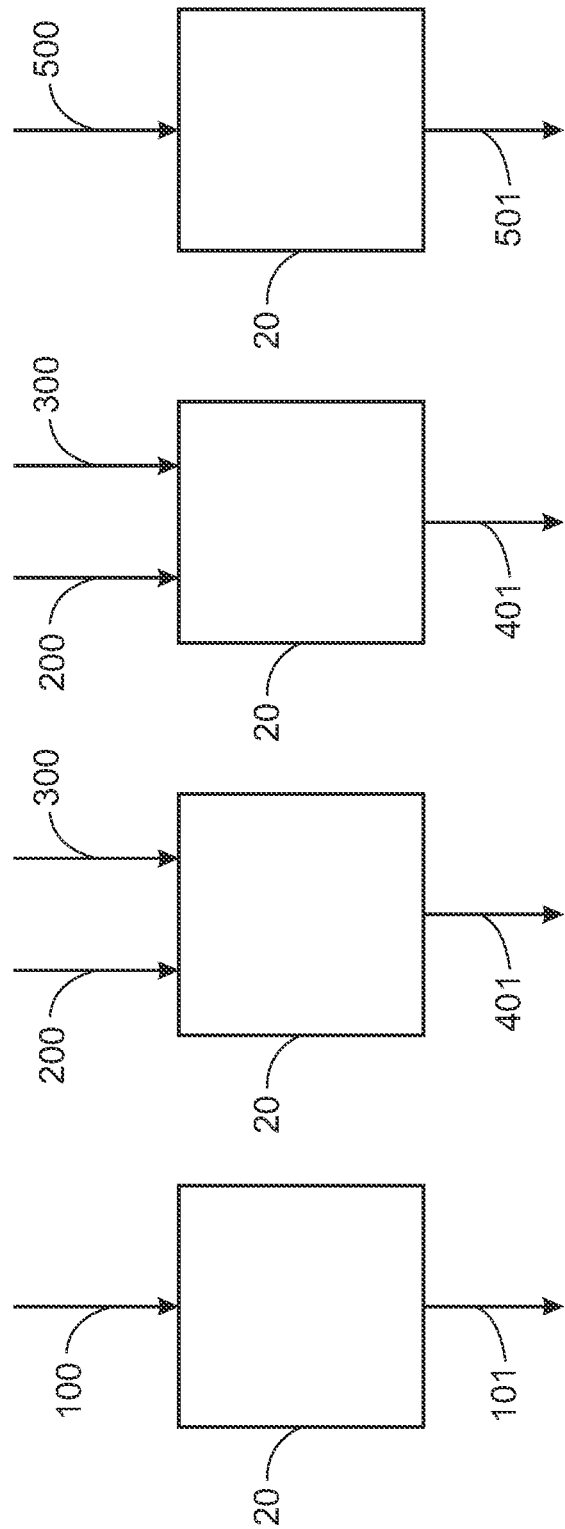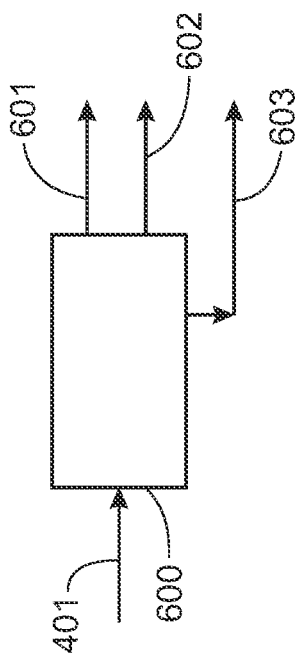

METHODS OF REGENERATING A SORBENT

FIELD

The disclosure generally relates to methods of regenerating a sorbent used in an adsorption process. The methods can include using at least two different fluids to regenerate the sorbent.

BACKGROUND

It can be desirable to capture $CO_2$ to reduce the possibility that the $CO_2$ may be released to the environment and have a negative impact on the environment. It is common to achieve this by adsorbing the $CO_2$ to a sorbent. This approach can be used, for example, when the $CO_2$ is initially present in a mixture of gases, such as in ambient air or $CO_2$ generated from a point source, e.g., a power plant. Subsequently, the sorbent can be regenerated by heating, a gas sweep or vacuum to desorb the $CO_2$, thereby allowing the sorbent to be used for future $CO_2$ capture. The desorbed $CO_2$ can be treated as appropriate. For example, the $CO_2$ can be compressed (liquefied) for subsequent processing.

SUMMARY

The disclosure generally relates to methods of regenerating a sorbent used in an adsorption process. As an example, the methods can be used to remove adsorbed $CO_2$ from a solid sorbent to regenerate the sorbent.

In general, the methods include simultaneously contacting the sorbent with two different fluids. The first fluid contains steam and optionally one or more additional species (e.g., $CO_2$), and the second fluid contains one or more species that are separable from the first fluid and the desorbed species (e.g., $CO_2$). The second fluid can be used to control the concentration of the steam. The two fluids are simultaneously provided to the sorbent to heat the sorbent, thereby desorbing the adsorbate (e.g., $CO_2$) from the sorbent.

Some formulated sorbents are steam stable whereas other sorbents are susceptible to steam-induced degradation when exposed to steam. Water polarity and small kinetic diameter can potentially displace some of the sorbent constituents and the strong interactions water can form with the functional groups generally present in sorbents can cause the sorbent framework to collapse. The disclosure provides compositions selected to control the steam ratio which eventually limits sorbent degradation.

It has been found that the methods can provide a variety of benefits. As an example, the methods can result in relatively little, if any, damage to the sorbent susceptible to steam degradation due to the regeneration process, compared, for example, to corresponding processes in which only steam is used to regenerate the sorbent. This can increase the useful lifetime of the sorbent, maintain the adsorption efficiency of the sorbent, and/or reduce costs associated with replacing the sorbent. The methods can provide relatively fast desorption of the adsorbate and regeneration of the sorbent compared to using pure Fluid 2 (see discussion below) as a sole regeneration medium. The methods can allow for the effective capture of $CO_2$, thereby reducing the presence of $CO_2$ in the atmosphere and its related environmental impact. The methods can allow for reduced sorbent bed sizes; thus, reducing the capital cost which can be beneficial for certain $CO_2$ capture applications.

In some embodiments, the $CO_2$ source is air. In some embodiments, the $CO_2$ source is a point source. In such embodiments, the methods enable emission reduction.

In some embodiments, the relative amount of the constituents in the first and second fluids is controlled so that, while the sorbent is sufficiently heated by the first and second fluids to cause desorption of the adsorbed species, the sorbent undergoes relatively little, if any, damage caused by exposure to the first and second fluids. For example, in certain embodiments, of the total amount of the first and second fluids provided to the sorbent, from 5 mole percent (mol %) to 95 mol % is steam.

Generally, the second fluid can contain one or more species. Typically, each species has a diameter that is larger than the pore size of the sorbent to reduce the likelihood that the species can be adsorbed in cavities of the sorbent and/or displace any of the sorbent constituents. In general, the one or more species in the second fluid are selected so that they can be separated from the first fluid and the desorbed species (adsorbate) after the first and second fluids interact with the sorbent and desorb the adsorbate. In some embodiments, the second fluid has a calorific capacity that is less than the calorific capacity of water. In certain embodiments, the second fluid contains one or more species that are non-polar or less polar than water. In certain embodiments, the second fluid contains one or more species that are immiscible with water. In some embodiments, the second fluid contains one or more species having a boiling point between 70° C. and 200° C. In certain embodiments, the second fluid contains one or more species having a boiling point that is at least 30° C. different from a boiling point of water.

Desorption of the previously adsorbed species can result in a fluid mixture downstream of the sorbent, wherein the mixture contains the first fluid (steam), the second fluid and the previously adsorbed species (e.g., $CO_2$). In some embodiments, the methods include isolating each of these three constituents from each other. As an example, the methods can include removing the previously adsorbed species ($CO_2$) from the downstream mixture, followed by separation of the first and second fluids from each other. In certain embodiments, a different order of separating the constituents of the downstream mixture can be used.

In an aspect, the disclosure provides a method of treating a sorbent having a species sorbed thereto. The method includes simultaneously providing first and second fluids to the sorbent to heat the sorbent and desorb the sorbed species from the sorbent. The first fluid is different from the second fluid. The first fluid includes steam. The second fluid is separable from the first fluid and the desorbed species.

In some embodiments, the second fluid includes a species having a calorific capacity that is less than a calorific capacity of water.

In some embodiments, the second fluid includes at least one species selected from a non-polar species, and a polar species that is less polar than water.

In some embodiments, the sorbent is a solid sorbent and the second fluid includes a species having a kinetic diameter that is larger than the solid sorbent pore diameter.

In some embodiments, the first and second fluids are immiscible.

In some embodiments, the second fluid includes a hydrocarbon.

In some embodiments, the second fluid includes at least one member selected from alkanes, alkenes, alkynes, cycloalkanes, carbonyls, nitriles, aromatics, and, acids, alcohols, and halogenated hydrocarbons.

In some embodiments, the second fluid includes at least one member selected from carbon tetrachloride, hydrofluoroethers, perfluorooctane, perfluoromethylcyclohexane, hexane, isomers of hexane, heptane, isomers of heptane, octane, isomers of octane, benzene, toluene, cyclopentane, xylene, trimethyl pentane, trimethyl hexane, acetonitrile, and butanone.

In some embodiments, the second fluid includes at least one member selected from the group consisting of acids and alcohols.

In some embodiments, the boiling point of the at least one member is at least 30° C. different from a boiling point of water.

In some embodiments, the second fluid includes a species having a boiling point of from 70° C. to 200° C.

In some embodiments, the sorbent includes a solid sorbent.

In some embodiments, the sorbent includes a liquid sorbent.

In some embodiments, the method further includes, after providing the first and second fluids to the sorbent, separating the previously sorbed species, the first and second fluids from each other.

In some embodiments, the method further includes, after desorbing the sorbed species, capturing the previously sorbed species.

In some embodiments, the species includes $CO_2$.

In some embodiments, the method further includes controlling an amount of the second fluid provided to the sorbent independently of an amount of the first fluid provided to the sorbent.

In some embodiments, at least one of the following holds: an amount of the steam provided to the sorbent is less than a threshold for steam degradation of the sorbent; and an amount of the steam provided to the sorbent is such that a temperature of sorbent remains below a threshold for temperature degradation of the sorbent.

In some embodiments, a total amount of the first and second fluids provided to the sorbent includes from 5 mole percent (mol %) to 95 mol % of steam.

In some embodiments, the sorbent includes a solid sorbent, the second fluid includes a hydrocarbon, the compound includes $CO_2$, and the method further includes: after simultaneously providing first and second fluids to the sorbent, capturing the $CO_2$; and after capturing the $CO_2$, separating the first and second fluids from each other.

In some embodiments, the method further includes selecting a flow rate of the first fluid and a flow rate of the second fluid to maximize heat capacity, thereby minimizing the total regeneration fluid recirculation rates.

In another aspect, the disclosure provides a method of treating a sorbent having a species sorbed thereto. The method includes: i) simultaneously providing first and second fluids to the sorbent to heat the sorbent and desorb the sorbed species from the sorbent; ii) after i), capturing the previously sorbed species; and iii) after ii), separating the first and second fluids from each other. The first fluid is different from the second fluid. The first fluid includes steam. The second fluid includes a species having a lower calorific capacity than the first fluid.

In a further aspect, the disclosure provides a method of treating a sorbent having a species sorbed thereto. The method includes: i) simultaneously providing first and second fluids to the sorbent to heat the sorbent and desorb the sorbed species from the sorbent; ii) after i), capturing the previously sorbed species; and iii) after ii), separating the first and second fluids from each other. The first fluid is different from the second fluid. The first fluid includes steam. The second fluid includes a species that is less polar than water.

In a further aspect, the disclosure provides a method of treating a solid sorbent having a species adsorbed thereto. The method includes: i) simultaneously providing first and second fluids to the sorbent to heat the sorbent and desorb the adsorbed species from the sorbent; ii) after i), capturing the previously adsorbed species; and iii) after ii), separating the first and second fluids from each other. The first fluid is different from the second fluid. The first fluid includes steam. The second fluid includes a species having a larger kinetic diameter than the solid sorbent pore diameter.

BRIEF DESCRIPTION OF THE FIGURES

FIGS. 1A-1E schematically depict steps in a method.

DETAILED DESCRIPTION

Figure 2:
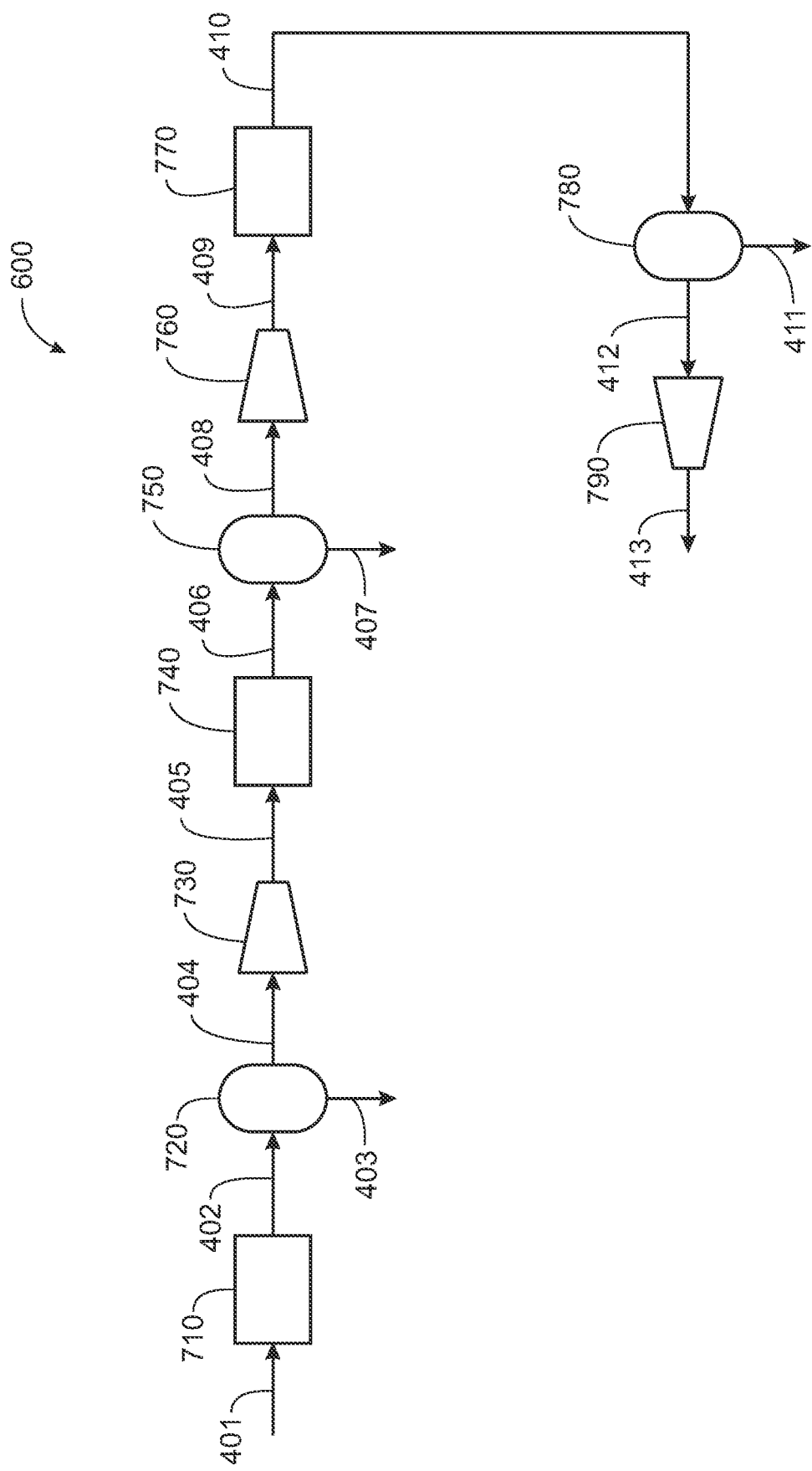
FIG. 2 schematically depicts a system for a method.

FIGS. 1A-1E schematically depict steps in a method according to the disclosure.

FIG. 1A schematically depicts the adsorption of $CO_2$ to the sorbent. In particular, FIG. 1A shows a $CO_2$-containing stream 100 contacts a sorbent 20 (e.g., a sorbent bed) under conditions such that $CO_2$ in the stream 100 adsorbs to the sorbent 20, resulting in a stream 101 having a lower concentration of $CO_2$ than is present in the stream 100, i.e., the stream 101 is a lean $CO_2$ stream. In some embodiments, the $CO_2$ containing stream 100 is a stream resulting from an industrial process such as natural gas turbines, furnaces, cement plants, refineries or steel making. In some embodiments, the $CO_2$ containing stream 100 is ambient air. In some embodiments the stream 101 contains 0%-5%, 5%-20%, 20-70% of the $CO_2$ in the stream 100.

FIG. 1B depicts heating of the sorbent to the desorption temperature of $CO_2$. Specifically, FIG. 1B shows a first fluid stream 200 and a second fluid stream 300 simultaneously being provided to the sorbent 20 to heat the sorbent bed 20 to the desorption temperature of $CO_2$, and a fluid stream 401 downstream of the sorbent 20. The predominant species in the stream 401 correspond to the predominant species in the fluid streams 200 and 300. In FIG. 1B, the flow rates of the first and second fluid streams 200 and 300, can be controlled so that, the heat capacity is maximized to reduce the flow rate of fluid streams 200 and 300 and the fluid streams 200 and 300 heat the sorbent 20 to the appropriate temperature while causing little, if any, damage to the sorbent 20. For example, the relative amount of steam provided to the sorbent can be controlled such that little, if any, damage is done to the sorbent due to the presence of water/steam at the sorbent 20.

The first fluid stream 200 contains steam. In some embodiments, the first fluid stream 200 can contain one or more additional species, such as $CO_2$, and/or small amount of impurities including $N_2$, Ar and $O_2$.

The second fluid stream 300 can contain one or more species. In general, the species contained in the second fluid stream 300 are separable from steam and the desorbed species (e.g., $CO_2$). In some embodiments, the species contained in the second fluid stream 300 have a calorific capacity that is less than the calorific capacity of water. In certain embodiments, the species contained in the second fluid stream 300 are less polar than water, e.g., non-polar. In certain embodiments, the species contained in the second fluid stream 300 are immiscible with water. In some embodiments, the species contained in the second fluid stream have a boiling point between 70° C. and 200° C. In certain embodiments, the second fluid contains one or more species having a boiling point that is at least 30° C. (e.g., at least 40° C., at least 50° C.) different from a boiling point of water.

In certain embodiments, the second fluid stream 300 contains one or more species having a long hydrocarbon chain, such as a hydrocarbon chain with at least five carbons (e.g., at least six carbon, at least seven carbons, at least eight carbons).

In some embodiments, the second fluid stream 300 includes at least one hydrocarbon, such as at least one alkane (e.g., at least one cycloalkane), at least one alkene, at least one alkyne, at least one carbonyl, at least one nitrile, and/or at least one aromatic hydrocarbon. In certain embodiments, a hydrocarbon contained in the second fluid stream 300 can be halogenated. In some embodiments, the second fluid stream 300 contains carbon tetrachloride, hydrofluoroethers, perfluorooctane, perfluoromethylcyclohexane, hexane, isomers of hexane, heptane, isomers of heptane, octane, isomers of octane, benzene, toluene, cyclopentane, xylene, trimethyl pentane, trimethyl hexane, acetonitrile, and/or butanone. In some embodiments, the second fluid stream 300 contains at least one acid (e.g. at least one formic acid) and/or at least one alcohol (e.g. at least one ethanol).

In general, the sorbent 20 is a solid sorbent. In some embodiments, the sorbent 20 is present in a bed, such as a fixed bed, a fluidized bed or a moving bed. In certain embodiments, the sorbent 20 can be a metal organic framework (MOF), a covalent organic framework (COF), a zeolite, a zeolitic imidazolate frameworks (ZIF) an amine immobilized on a solid support, a Scholl-coupled organic polymer (SCP), a hyper cross-linked organic polymer (HCP), a conjugated microporous organic polymer (CMPs), an amine-modified silica, an amino polymer, or a $K_2CO_3$ based composite sorbent.

In general, the temperature to which the sorbent 20 is heated is at least partially determined based on the adsorbent and the adsorbate to be desorbed. Further, without wishing to be bound by theory, it is also believed that, in some embodiments, damage to the sorbent 20 caused by steam is related to the regeneration temperature driven by the steam temperature driving to which temperature the sorbent 20 is heated. In some embodiments, the sorbent 20 is heated to a temperature of 80-200° C. (e.g. 80° C., 90° C., 100° C., 110° C., 120° C., 130° C., 140° C., 150° C., 160° C., 170° C., 180° C., 190° C., 200° C., 80-90° C., 80-100° C., 80-110° C., 80-120° C., 80-130° C., 80-140° C., 80-150° C., 80-160° C., 80-170° C., 80-180° C., 80-190° C., 90-100° C., 90-110° C., 90-120° C., 90-130° C., 90-140° C., 90-150° C., 90-160° C., 90-170° C., 90-180° C., 90-190° C., 90-200° C., 100-110° C., 100-120° C., 100-130° C., 100-140° C., 100-150° C., 100-160° C., 100-170° C., 100-180° C., 100-190° C., 100-200° C., 110-120° C., 110-130° C., 110-140° C., 110-150° C., 110-160° C., 110-170° C., 110-180° C., 110-190° C., 110-200° C., 120-130° C., 120-140° C., 120-150° C., 120-160° C., 120-170° C., 120-180° C., 120-190° C., 120-200° C., 130-140° C., 130-150° C., 130-160° C., 130-170° C., 130-180° C., 130-190° C., 130-200° C., 140-150° C., 140-160° C., 140-170° C., 140-180° C., 140-190° C., 140-200° C., 150-160° C., 150-170° C., 150-180° C., 150-190° C., 150-200° C., 160-170° C., 160-180° C., 160-190° C., 160-200° C., 170-180° C., 170-190° C., 170-200° C., 180-190° C., 180-200° C., 190-200° C.). In some embodiments, the amount of steam to which the sorbent 20 is exposed is determined by the desired temperature of the sorbent.

Without wishing to be bound by theory, it is believed that, in certain embodiments, damage to the sorbent 20 can be caused by the amount of steam to which the sorbent 20 is exposed. In some embodiments, of the total amount of the first and second fluids provided to the sorbent 20, from 5-95 mol % (e.g. 5 mol %, 10 mol %, 15 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, 85 mol %, 90 mol %, 95 mol %, 5-90 mol %, 5-85 mol %, 5-80 mol %, 5-75 mol %, 5-70 mol %, 5-65 mol %, 5-60 mol %, 5-55 mol %, 5-50 mol %, 5-45 mol %, 5-40 mol %, 5-35 mol %, 5-30 mol %, 5-25 mol %, 5-20 mol %, 5-15 mol %, 5-10 mol %, 10-95 mol %, 10-90 mol %, 10-85 mol %, 10-80 mol %, 10-75 mol %, 10-70 mol %, 10-65 mol %, 10-60 mol 10%, 10-55 mol %, 10-50 mol %, 10-45 mol %, 10-40 mol %, 10-35 mol %, 10-30 mol %, 10-25 mol %, 10-20 mol %, 10-15 mol %, 15-95 mol %, 15-90 mol %, 15-85 mol %, 15-80 mol %, 15-75 mol %, 15-70 mol %, 15-65 mol %, 15-60 mol %, 15-55 mol %, 15-50 mol %, 15-45 mol %, 15-40 mol %, 15-35 mol %, 15-30 mol %, 15-25 mol %, 15-20 mol %, 20-95 mol %, 20-90 mol %, 20-85 mol %, 20-80 mol %, 20-75 mol %, 20-70 mol %, 20-65 mol %, 20-60 mol %, 20-55 mol %, 20-50 mol %, 20-45 mol %, 20-40 mol %, 20-35 mol %, 20-30 mol %, 20-25 mol %, 25-95 mol %, 25-90 mol %, 25-85 mol %, 25-80 mol %, 25-75 mol %, 25-70 mol %, 25-65 mol %, 25-60 mol %, 25-55 mol %, 25-50 mol %, 25-45 mol %, 25-40 mol %, 25-35 mol %, 25-30 mol %, 30-95 mol %, 30-90 mol %, 30-85 mol %, 30-80 mol %, 30-75 mol %, 30-70 mol %, 30-65 mol %, 30-60 mol %, 30-55 mol %, 30-50 mol %, 30-45 mol %, 30-40 mol %, 30-35 mol %, 35-95 mol %, 35-90 mol %, 35-85 mol %, 35-80 mol %, 35-75 mol %, 35-70 mol %, 35-65 mol %, 35-60 mol %, 35-55 mol %, 35-50 mol %, 35-45 mol %, 35-40 mol %, 40-95 mol %, 40-90 mol %, 40-85 mol %, 40-80 mol %, 40-75 mol %, 40-70 mol %, 40-65 mol %, 40-60 mol %, 40-55 mol %, 40-50 mol %, 40-45 mol %, 45-95 mol %, 45-90 mol %, 45-85 mol %, 45-80 mol %, 45-75 mol %, 45-70 mol %, 45-65 mol %, 45-60 mol %, 45-55 mol %, 45-50 mol %, 50-95 mol %, 50-90 mol %, 50-85 mol %, 50-80 mol %, 50-75 mol %, 50-70 mol %, 50-65 mol %, 50-60 mol %, 50-55 mol %, 55-95 mol %, 55-90 mol %, 55-85 mol %, 55-80 mol %, 55-75 mol %, 55-70 mol %, 55-65 mol %, 55-60 mol %, 60-95 mol %, 60-90 mol %, 60-85 mol %, 60-80 mol %, 60-75 mol %, 60-70 mol %, 60-65 mol %, 65-95 mol %, 65-90 mol %, 65-85 mol %, 65-80 mol %, 65-75 mol %, 65-70 mol %, 70-95 mol %, 70-90 mol %, 70-85 mol %, 70-80 mol %, 70-75 mol 30%, 75-95 mol %, 75-90 mol %, 75-85 mol %, 75-80 mol %, 80-95 mol %, 80-90 mol %, 80-85 mol %, 85-95 mol %, 85-90 mol %, 90-95 mol %) is steam. In some embodiments, the amount of steam provided to the sorbent 20 is constant over time. In certain embodiments, the amount of steam provided to the sorbent 20 varies over time. In general, the relative amounts of the species contained in the first and second fluid streams 200 and 300, respectively, can be determined experimentally or via simulations.

FIG. 1C schematically depicts further heating of the sorbent by the first and second fluid streams, resulting in $CO_2$ desorption. Particularly, FIG. 1C shows the first and second fluid streams 200 and 300 being provided to the sorbent 20, resulting in the fluid stream 401 downstream of the sorbent 20. However, unlike the situation in FIG. 1B, in FIG. 1C the fluid stream 401 contains a relatively large amount of desorbed $CO_2$ in addition to the predominant constituents of the fluid streams 200 and 300. In FIG. 1C, the flow rates of the first and second fluid streams 200 and 300, as well as the relative amount of each species contained in the streams 200 and 300, can be controlled so that, while the $CO_2$ desorbs from the sorbent 20, little, if any, damage is caused to the sorbent 20 due to the fluid streams 200 and 300. In general, the temperature of the sorbent 20 in FIG. 1C is equal to or greater than the desorption temperature of $CO_2$ and/or another adsorbate of interest. In some embodiments, the amount of the first and second fluid streams 200 and 300 (e.g., the amount of steam) for the desorption step in 1C are the same as those in the heating step in 1B. In some embodiments, the amount of the first and second fluid streams 200 and 300 (e.g., the amount of steam) for the desorption step in 1C are different from those in the heating step in 1B. In some embodiments, in addition to $CO_2$, water vapor may be adsorbed to the sorbent 20. In such embodiments, the water vapor is desorbed along with the $CO_2$, and the flow of the fluid streams 200 and 300 can be adjusted to maintain the desired amounts of the constituents of the fluid streams 200 and 300 at the sorbent 20. For example, the relative amount of steam provided to the sorbent can be controlled such that little, if any, damage is done to the sorbent due to the presence of water/steam at the sorbent 20.

FIG. 1D schematically depicts cooling the sorbent 20 after $CO_2$ desorption. Specifically, FIG. 1D shows a fluid stream 500 being provided to the sorbent 20 to cool the sorbent 20 (e.g., back to its initial temperature), and a stream 501 downstream of the sorbent 500. The predominant species contained in the stream 501 are the same as the predominant species in the stream 500, but the stream 501 is hotter than the stream 500. In general, any appropriate fluid can be used for the fluid stream 500. In some embodiments, the fluid stream 500 contains an inert gas (e.g., nitrogen gas, argon, helium). In certain embodiments, the fluid stream 500 is an air stream. In such embodiments, the fluid stream 501 can be vented to the atmosphere.

FIG. 1E schematically depicts separating fluids in the fluid stream 401 from each other. In particular, FIG. 1E shows the stream 401 being provided to a recovery unit 600, resulting in streams 601, 602 and 603. The predominant species in the stream 601 is $CO_2$. The predominant species in the stream 602 are the same as the predominant species in the first fluid stream 200. The predominant species in the stream 603 are the same as the predominant species in the second fluid stream 300. In general, the recovery unit 600 can include conventional separation technologies for the noted separation. For example, the recovery unit 600 can include one or more compression, cooling and/or separation stages that enable the separation of the various fluids while compressing the $CO_2$. In some embodiments, the stream 401 can interact with a heat recovery system to recover heat from the stream 401 so that the heat can be used to generate the gaseous forms of the species in the first fluid stream 200 and/or the second fluid stream 300. For example, the recovered heat can be used to heat liquid water to provide steam for the first fluid stream 200.

Although each of FIGS. 1A-1E generally depict a single chamber/enclosure being used for the sorbent 20, more generally multiple different chambers/enclosures can be used for the sorbent 20. In some embodiments, the sorbent 20 is utilized for $CO_2$ capture in a continuous process. In certain embodiments, the sorbent 20 is utilized for $CO_2$ capture in a batch process. The various fluid streams can be provided to the chambers/enclosures in series, in parallel or in a combination thereof. In some embodiments, the sorbent 20 is moved to different chambers/enclosures without altering the gas pathway. In certain embodiments, each chamber/enclosure contains some of the sorbent 20. In such embodiments, the $CO_2$ containing stream 100 and the fluid streams 200 and 300 are provided to the sorbent sequentially.

Although FIGS. 1B and 1C depict the first and second fluid streams 200 and 300 being separately provided to the sorbent 20, in some embodiments, the fluid streams 200 and 300 can be combined upstream of the sorbent 20. For example, in such embodiments, the fluid streams 200 and 300 can be provided to the sorbent 20 via a single inlet port, rather than via separate inlet ports.

In some embodiments, the methods further include a purging of the chamber(s)/enclosure(s) containing the sorbent 20 before heating the sorbent 20. For example, purging can be used to remove residual gases from the chamber/enclosure containing the sorbent. In certain embodiments, a vacuum can be used for purging. In some embodiments, a sweep gas is used for purging. Optionally, the sweep gas can be formed of the first fluid, or the second fluid or a combination thereof. In such embodiments, an additional outlet stream may be used to collect the sweep gas.

In certain embodiments, the methods can include an additional step in which residual $CO_2$ is removed from the chamber(s) containing the sorbent 20 before the sorbent 20 is cooled. For example, this can be done using a vacuum before cooling the sorbent 20.

In some embodiments, the sorbent 20 is cooled through indirect cooling. This can be done in addition to or instead of using the fluid stream 500. In certain embodiments, such indirect cooling medium is achieved using a heat exchanger (i.e coil) inside the sorbent 20. In such embodiments, the coil can optionally be used to assist in heating the sorbent 20 (FIGS. 1B and 1C).

FIG. 2 schematically depicts a system 700 for separating the components in the fluid stream 401. Initially, the fluid stream 401 goes to a heat exchanger 710 where it is cooled to near ambient temperature to provide a fluid stream 402 which goes to a phase separator 720, which separates the $CO_2$ from the first and second fluids. Some or all of the first and second fluids exit the separator 720 as a liquid stream 403. Typically, the first and second fluids are immiscible, allowing the first and second fluids in the liquid stream 403 to be separated using, for example, a conventional approach, such as gravity separation. The $CO_2$ and uncondensed portions of the first and second fluids exit the separator 720 in the vapor phase in a fluid stream 404 which is sent to a compressor train 730 to compress the species in the stream 404, resulting in a stream 405 containing the compressed species. The stream 405 goes to a heat exchanger 740, where the constituents in the stream 405 are cooled to near ambient temperature, resulting in a stream 406. The stream 406 goes to a separator 750 to remove the condensed amount of the first and second fluids, resulting in a stream 407 containing the condensed first and second fluids (which can undergo further processing as discussed above with respect to the stream 403). In addition, the separator 750 results in a stream 408 containing the $CO_2$ and the remaining uncondensed first fluid and second fluid. The stream 408 goes to a compressor 760 to compress the species in the stream 408, resulting in a stream 409 containing the compressed species. The stream 409 goes to a heat exchanger 770 where the species in the stream 409 are further cooled, resulting in a stream 410 of the further cooled species. The stream 410 goes to a separator 780, resulting in a stream 411 containing the condensed species from the first and second fluids (which can undergo further processing as discussed above with respect to the stream 403). In addition, the separator 780 results in a stream 412 containing the $CO_2$ and remaining uncondensed first fluid and second fluids. The stream 412 goes to a compressor 790 to provide a $CO_2$-rich stream 413. In some embodiments, the gas in the stream 413 meets the desired level of $CO_2$ purity such that further purification of the stream 413, while optional, need not be performed. In certain embodiments, the gas in the stream 413 does not meet the desired level of purity for $CO_2$. In such embodiments, the stream 413 can undergo further compression and/or purification to provide $CO_2$ at the desired level of purity. Such additional compression and/or purification can be performed using the system 700 in which the stream 413 can be used as the input stream rather than the stream 401.

EXAMPLES

Aspen Adsorption was used to simulate the process with several regeneration mediums. Simulations were conducted for $CO_2$ capture from a natural gas combine cycle (NGCC) flue stream. The component physical properties were defined using the Peng-Robinson equation of state. A 0.53 $m^3$ cylindrical vertical adsorption bed was used as the basis of the adsorption simulations. The Upwind Differencing Scheme 1 (UDS1) was selected as the discretization method with 20 spatial nodes. The equilibrium model used was the Langmuir type II isotherm with the ideal adsorbed solution (IAS) theory to account for competitiveness between the adsorbates. A lumped resistance kinetic model was used to estimate the component adsorption kinetics. The momentum balance was modeled using the Ergun equation to calculate the pressure drop across the bed. A rigorous energy balance was defined that considers gas, solid and wall conduction, heat transfer with the surroundings and temperature variation along the bed.

The step time of various steps in the adsorption/desorption cycle were fixed except for the desorption time, which was based on a specified amount of $CO_2$ to be desorbed after which the cycle would move to the next step. This was done to gauge the performance of the regeneration medium at desorbing the $CO_2$ and the ability to recover this amount of $CO_2$ from the regeneration fluid outlet stream.

The results are presented in Table 1. Fluid 1 contained only steam, and Fluid 2 contained only heptane. The sorbent used was NbOFFIVE-1-Ni MOF.

TABLE 1

Simulation results

| Regeneration medium | Cycle time (s) | $CO_2$ recovery | Total flow of Fluid 1 (kg) | Total flow of Fluid 2 (kg) |
|---|---|---|---|---|
| Fluid 1 | 2612 | 99.9% + (40° C.*) | 101 | 0 |
| Fluid 2 | 4429 | 70% + (40° C.*) | 0 | 1318 |
| 25 mol % Fluid 1 75 mol % Fluid 2 | 3550 | 85.0% + (40° C.*) | 45 | 749 |
| 50 mol % Fluid 1 50 mol % Fluid 2 | 3028 | 90.0% + (40° C.*) | 68 | 379 |
| 75 mol % Fluid 1 25 mol % Fluid 2 | 2761 | 95.0% + (40° C.*) | 85 | 158 |

*40° C. temperature set at the outlet of heat exchangers 710, 740, 770

Desorption using only Fluid 1 provided the shortest cycle time with the highest $CO_2$ purity. However, it is believed that using only Fluid 1 would compromise the sorbent stability and lifetime. Desorption using only Fluid 2 provided the longest cycle times and lowest $CO_2$ recovery rates. Desorption performance with Fluid 1 and Fluid 2 improved with increasing Fluid 1 fraction. Thus, the data in Table 1 demonstrate that it should be possible to select an appropriate (e.g., optimized) mixture of Fluid 1 and Fluid 2 to obtain a desired $CO_2$ recovery while limiting (e.g., avoiding) sorbent degradation.

OTHER EMBODIMENTS

While only certain embodiments have been disclosed, the disclosure is not limited to such embodiments.

As an example, while solid sorbents have been described, in certain embodiments, the methods can be used to regenerate a liquid sorbent. Examples of liquid sorbents include ionic liquids such as imidazolium based ionic liquids.

As another example, while the adsorption/desorption of $CO_2$ has been disclosed, in some embodiments, the methods can be used to adsorb/desorb (capture) different gases, such as $CH_4$, nitrogen, oxygen, hydrogen, ethylene and gaseous hydrocarbons, $H_2S$, water vapor in dehumidification applications and atmospheric water capture, nitrogen oxides, and sulfur dioxides.

What is claimed is:

1. A method of treating a sorbent having a species sorbed thereto, the method comprising:
   simultaneously providing first and second fluids to the sorbent to heat the sorbent and desorb the sorbed species from the sorbent,
   wherein the first fluid is different from the second fluid, the first fluid comprises steam, and the second fluid is separable from the first fluid and the desorbed species.

2. The method of claim 1, wherein the second fluid comprises a species having a calorific capacity that is less than a calorific capacity of water.

3. The method of claim 1, wherein the second fluid comprises at least one species selected from the group consisting of a non-polar species, and a polar species that is less polar than water.

4. The method of claim 1, wherein the first and second fluids are immiscible.

5. The method of claim 1, wherein the second fluid comprises a hydrocarbon.

6. The method of claim 1, wherein the second fluid comprises at least one member selected from the group consisting of alkanes, alkenes, alkynes, cycloalkanes, carbonyls, nitriles, aromatics, acids, alcohols, and halogenated hydrocarbons.

7. The method of claim 1, wherein the second fluid comprises at least one member selected from the group consisting of carbon tetrachloride, hydrofluoroethers, perfluorooctane, perfluoromethylcyclohexane, hexane, isomers of hexane, heptane, isomers of heptane, octane, isomers of octane, benzene, toluene, cyclopentane, xylene, trimethyl pentane, trimethyl hexane, acetonitrile, and butanone.

8. The method of claim 1, wherein the second fluid comprises at least one member selected from the group consisting of acids and alcohols.

9. The method of claim 8, wherein a boiling point of the at least one member is at least 30° C.different from a boiling point of water.

10. The method of claim 1, wherein the second fluid comprises a species having a boiling point of from 70° C.to 200° C.

11. The method of claim 1, wherein the sorbent comprises a solid sorbent.

12. The method of claim 1, further comprising, after providing the first and second fluids to the sorbent, separating the previously sorbed species, the first and second fluids from each other.

13. The method of claim 12, further comprising, after desorbing the sorbed species, capturing the previously sorbed species.

14. The method of claim 1, wherein the species comprises $CO_2$.

15. The method of claim 1, further comprising controlling an amount of the second fluid provided to the sorbent independently of an amount of the first fluid provided to the sorbent.

16. The method of claim 1, wherein at least one of the following holds:
- an amount of the steam provided to the sorbent is less than a threshold for steam degradation of the sorbent; and
- an amount of the steam provided to the sorbent is such that a temperature of sorbent remains below a threshold for temperature degradation of the sorbent.

17. The method of claim 1, wherein a total amount of the first and second fluids provided to the sorbent comprises from 5 mole percent (mol %) to 95 mol % of steam.

18. The method of claim 1, wherein the sorbent comprises a solid sorbent, the second fluid comprises a hydrocarbon, the species comprises $CO_2$, and the method further comprises:
after simultaneously providing first and second fluids to the sorbent, capturing the $CO_2$; and
after capturing the $CO_2$, separating the first and second fluids from each other.

19. A method of treating a sorbent having a species sorbed thereto, the method comprising:
i) simultaneously providing first and second fluids to the sorbent to heat the sorbent and desorb the sorbed species from the sorbent;
ii) after i), capturing the previously sorbed species; and
iii) after ii), separating the first and second fluids from each other,
wherein the first fluid is different from the second fluid, the first fluid comprises steam, and the second fluid comprises a species having a lower calorific capacity than the first fluid.

20. A method of treating a sorbent having a species sorbed thereto, the method comprising:
i) simultaneously providing first and second fluids to the sorbent to heat the sorbent and desorb the sorbed species from the sorbent;
ii) after i), capturing the previously sorbed species; and
iii) after ii), separating the first and second fluids from each other, wherein the first fluid is different from the second fluid, the first fluid comprises steam, and the second fluid comprises a species that is less polar than water.

* * * * *